June 2, 1931. R. WEIDE 1,808,442
METHOD OF MANUFACTURING CYLINDRICAL PLATES OF GLASS OR A SIMILAR
MATERIAL FOR USE IN CONNECTION WITH POLYGRAPHIC APPARATUS
Filed Sept. 11, 1929 2 Sheets-Sheet 1
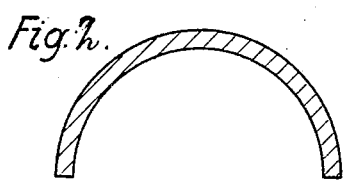
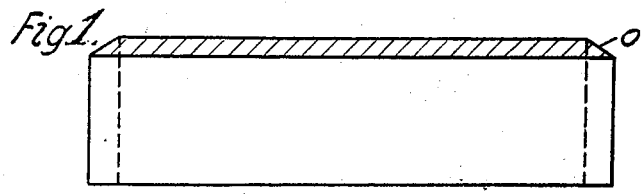
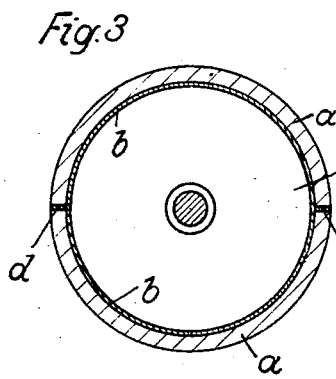
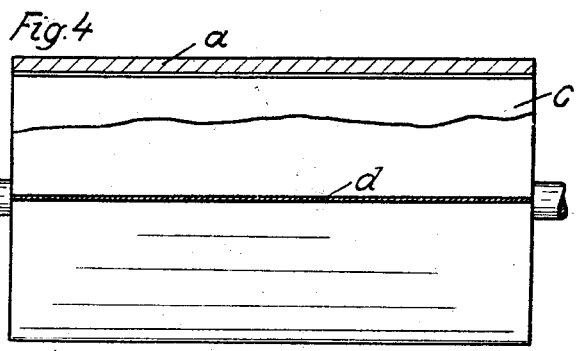
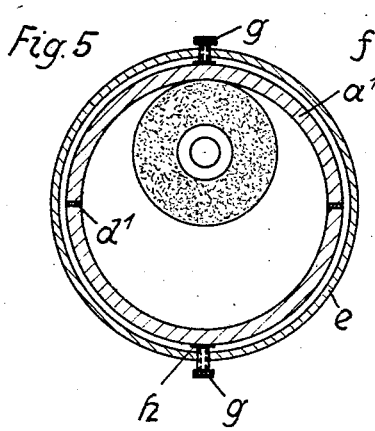
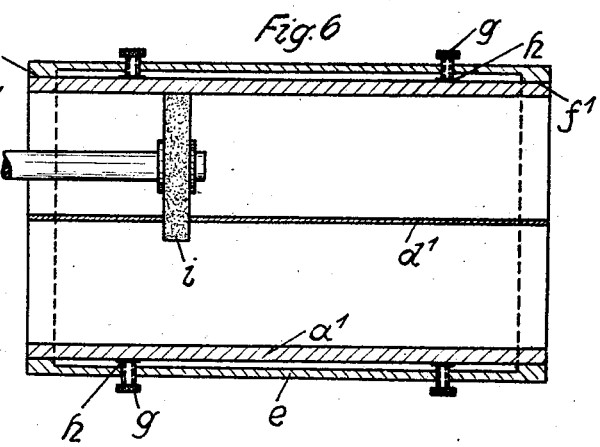
Inventor
Rudolph Weide
by
attorney

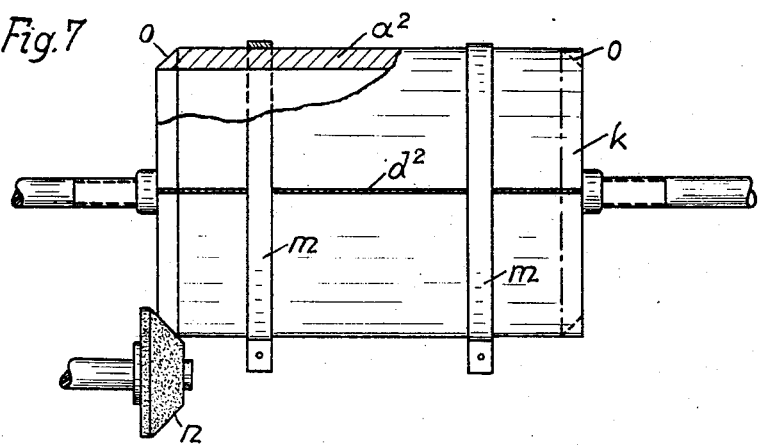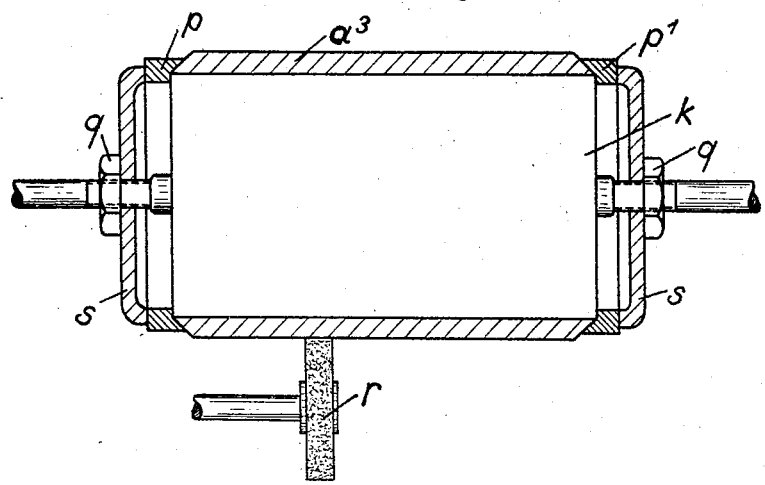

Patented June 2, 1931

1,808,442

UNITED STATES PATENT OFFICE

RUDOLPH WEIDE, OF BERLIN, GERMANY

METHOD OF MANUFACTURING CYLINDRICAL PLATES OF GLASS OR A SIMILAR MATERIAL FOR USE IN CONNECTION WITH POLYGRAPHIC APPARATUS

Application filed September 11, 1929, Serial No. 391,922, and in Germany March 6, 1928.

It is known to multiply writings in this way that the original to be reproduced is written with a specially prepared ink, a plate of glass or a similar material is coated with a certain liquid, the written original is pressed upon the dried coating, and this latter is then coated with a certain colored ink, this ink adhering to the first coating only at those places where that coating had come in contact with the letters or words of the original writing. The apparatus operating in that manner have had, hitherto, plane plates of glass etc., as no method existed to manufacture cylindrical plates with a sufficient degree of accuracy.

The present invention relates to a method of manufacturing accurate cylindrical plates by means of a certain grinding procedure, the grinding being carried out in the form of a plurality of successive phases with the aid of such grinding devices as are shown diagrammatically and by way of example on the accompanying drawings, on which Figure 1 is a longitudinal section and Figure 2 is a transverse section through a semi-cylindrical plate intended for use in connection with a polygraphic apparatus; Figure 3 is a transverse section through an apparatus for carrying out the first grinding phase; Figure 4 is partly (lower half) a side view of the same apparatus and partly (upper half) an axial section through the same; Figure 5 is a transverse section through an apparatus for carrying out the second grinding phase (viz. the interior grinding), and Figure 6 is an axial section through this apparatus; Fig. 7 shows how the semi-cylindrical glass plates are provided with facettes, and Figure 8 shows how the plates are finished by grinding them also exteriorly, all as fully described hereinafter.

The Figures 1 and 2 show a semi-cylindrical glass plate in finished state, i. e. ready for use in a polygraphic apparatus. The raw plate is either bent of a flat or plane plate, or directly cast in semi-cylindrical shape. $a$, $a$ Figs. 3 and 4, denote two such plates which are attached to a drum $c$ by means of layers of putty or the like $d$; the spaces between the two plates are also filled up with putty, as is indicated by the reference letter $d$. The object of this filling up of the spaces is to prevent the grinding disk from doing damage to the edges and rims of the plates.

The drum $c$ with the glass plates $a$, $a$ on it is inserted into a circular grinding machine and clamped fast therein, and the plates are then ground on their outer surface in such a manner that the outer diameter of the two-parted cylinder is a little larger then the finished cylinder is to have. The thus treated glass cylinder is then introduced into metallic cylinder $e$ (Figs. 5 and 6) having reinforced ends, as shown at $f$ and $f^1$, these reinforced ends forming internal ledges serving as abutment members for the semi-cylindrical parts $a^1$, $a^1$. The spaces between these parts are again filled up with putty, as shown at $d^1$. The ledges $f$, $f^1$ serve also to center the plates $a^1$ and to prevent them from rotation. There are in the metallic cylinder $e$ some screws $g$, the inner ends of which bear upon the outer circumferential surface of the glass plates. Preferably washers $h$ or the like are inserted between the screws $g$ and the outer surface of the glass plates.

Now the thus assembled members are again introduced into the circular grinding machine, and the inner surface of the glass plates is ground by means of a grinding disk $i$ (Figs. 5 and 6). This grinding is continued until the inner diameter of the glass cylinder has the required measure. Thereafter the two-parted cylinder is, respectively the semi-circular glass plates, placed on another cylindrical drum $k$ (Fig. 7) and the members $k$ and $a^2$ are connected with one another by two or more bands $m$. Now the drum $k$ with the glass plates on it is introduced into the grinding machine, and facettes $o$ are produced by means of a suitably shaped grinding disk $n$. Then suitably shaped annular holding members $p$ and $p^1$ are pressed onto the facetted ends by means of disk $s$ and nuts $q$, the bands $m$ are removed, and finally the outer circumferential surface of the semi-cylindrical plates are ground a second time by a grinding disk r, this grinding being now such that said outer surface receives its ultimate shape.

Also in the working stages according to Figs. 7 and 8 the spaces between the two glass-plates can be filled up with putty, as indicated at $d^2$ in Fig. 7, the object being also in these cases to prevent the edges or rims of the plates from being damaged.

I wish it to be understood that I do not limit myself to the exact design and construction of the mechanical appliances shown in the figures. These appliances may be of any other design or construction, provided, the latter be such as to permit the carrying out of the working phases described, and necessary to attain the object in view.

I claim:

1. The method of manufacturing cylindrical plates of glass or a similar material for use in connection with polygraphic apparatus, consisting in cementing the circularly curved plate to a cylindrical drum; grinding it preliminarily on its outer circumferential surface; introducing the plate into a cylinder, the internal diameter of which corresponds to the curvature of the plate; grinding the inner surface of the said plate to the accurate measure; attaching the plate to a drum; grinding facettes on its frontal ends, and finally grinding also the outer surface of the said plate to the accurate measure.

2. The method of manufacturing cylindrical plates of glass or a similar material for use in connection with polygraphic apparatus, consisting in cementing a plurality of circularly curved plates to a cylindrical drum; grinding them on said drum preliminarily on their outer circumferential surfaces; introducing the plates thereafter into a cylinder, the internal diameter of which corresponds to the curvature of the plates; grinding the inner surfaces of the said plates in said cylinder to the accurate measure; attaching thereafter the plates to a drum; grinding facettes on the frontal ends of the plates while they are retained on said drum, and finally grinding also the outer surface of the said plates to the accurate measure while they still are retained on the said drum, substantially as set forth.

3. The method of manufacturing cylindrical plates of glass or a similar material for use in connection with polygraphic apparatus, consisting in cementing a plurality of circularly curved plates to a cylindrical drum; grinding them on said drum preliminarily on their outer circumferential surfaces; introducing the plates thereafter into a cylinder, the internal diameter of which corresponds to the curvature of the plates; grinding the inner surfaces of the said plates in said cylinder to the accurate measure; attaching thereafter the plates to a drum; grinding facettes on the frontal ends of the plates while they are retained on said drum, and finally grinding also the outer surface of the said plates to the accurate measure while they still are retained on the said drum, the spaces between the plates being filled up with a putty prior to each of the working phases stated, for the purpose set forth.

4. The method of manufacturing cylindrical plates of glass or similar material for use in connection with polygraphic apparatus, comprising securing the curved plate to a cylindrical drum; grinding the plate on its outer circumferential surface; introducing the plate into a cylinder, the internal diameter of which corresponds to the curvature of the plate; grinding the inner surface of said plate to the accurate measure; attaching the plate to a drum; and grinding facettes on its frontal ends and finally grinding the outer surface of the plate to the accurate measure.

5. The method of manufacturing cylindrical plates of glass or similar material for use in connection with polygraphic apparatus, comprising securing the curved plate to a cylindrical drum; grinding the plate on its outer circumferential surface; introducing the plate into a cylinder, the internal diameter of which corresponds to the curvature of the plate; grinding the inner surface of said plate to the accurate measure; attaching the plate to a drum; and grinding the outer surface of the plate to the accurate measure.

In testimony whereof I affix my signature.

RUDOLPH WEIDE.